United States Patent Office 3,686,007
Patented Aug. 22, 1972

3,686,007
ALUMINOUS CERAMIC COMPOSITIONS WITH $TiO_2 + MnO_2$ FLUX
Leon Gion, Lourdes, France, assignor to Compagnie Generale d'Electro-Ceramique, Paris, France
Continuation-in-part of application Ser. No. 505,236, Oct. 26, 1965. This application Jan. 22, 1970, Ser. No. 5,104
Int. Cl. C04b *33/26*
U.S. Cl. 106—46      23 Claims

ABSTRACT OF THE DISCLOSURE

The present disclosure is directed to ceramic compositions useful, for example, for making large dimensional high tension insulators. The ceramic compositions contain a mixture of $TiO_2$ and $MnO_2$ in stated amounts to give said compositions the best overall properties of fabrication, drying, mechanical properties, electrical properties, firing range, color and price.

BACKGROUND OF THE INVENTION

Figure 1:
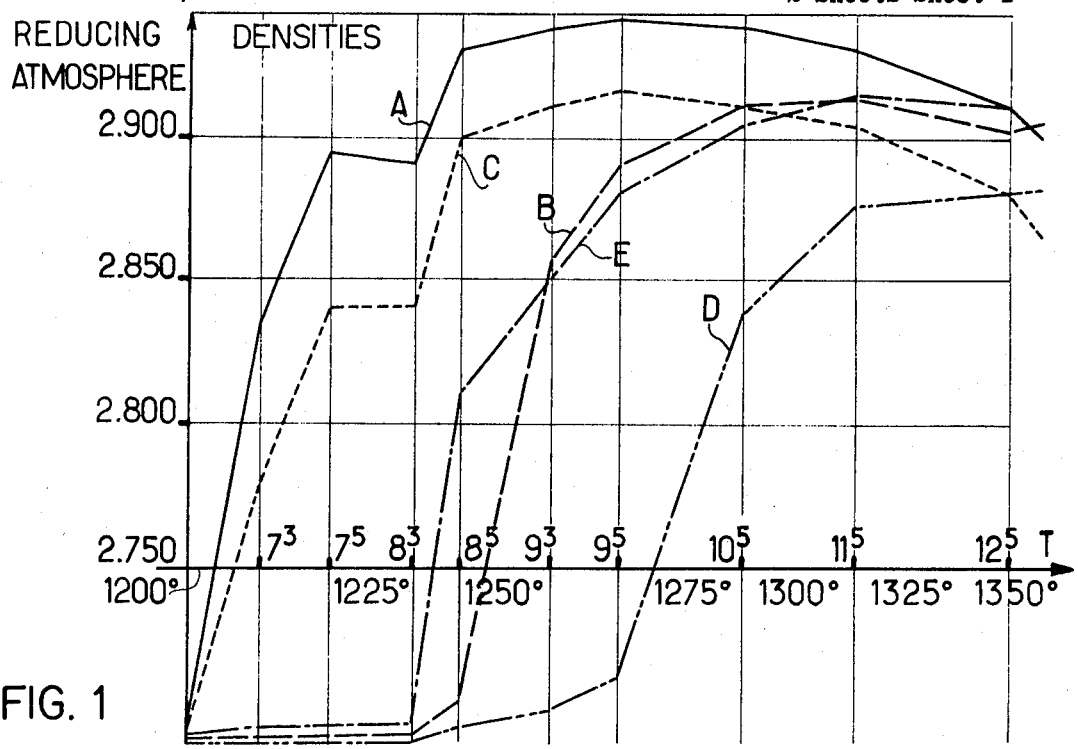

The present application is a continuation-in-part application of Ser. No. 505,236, filed Oct. 26, 1965, and now abandoned.

The present invention relates to ceramic compositions useful, for example, for making large dimensional, high tension insulators. More particularly, the present invention relates to aluminous porcelain compositions having superior mechanical and electrical and fabrication properties.

Ceramic compositions, such as those of the present invention, must have properties which correspond to the requirements for the manufacture and firing thereof while, at the same time, they must possess, to the smallest particle in the baked condition, superior electromechanical characteristics. Most important among these properties are the capacity for extruding and calibration, while drying, as well as, at the same time, a good cohesion in the dry condition, a large firing range and a certain inertness to atmospheric variations in the furnace. The drying problem is particularly difficult when fabricating, for example, large dimensional high tension insulators. In the past, those skilled in the art have attempted to reconcile these different and sometimes contradictory requirements by working particularly with the origin of the raw materials and with the granular characteristics of the compositions. This is the reason why certain compositions which have been set forth both in the technical literature and in patents have not been capable of reproduction, or only poorly so, outside of the very specific data set forth therein. Moreover, the formulae for these compositions are often of little interest since these compositions have been formulated in view of one particular characteristic or codition while other conditions, which should equally be considered in the formulation of these compositions so that they may be utilizable on an industrial scale, have been entirely neglected.

However, assuming that the formulations set forth in the prior art are as good as can be expected, it is found that the qualities of such a ceramic substance depend upon certain ratios of the mineralogical components thereof. It is generally accepted that an aluminous ceramic material for, for example, the manufacture of insulators, should comprise by weight:

| | Percent |
|---|---|
| Calcined alumina | 15–45 |
| Ball clay | 25–60 |
| Feldspar | 20–40 |

Such a composition is generally fired at a temperature of about 1100° to 1400° C.

The clays used as well as the feldspars always contain a certain percentage of quartz which is partially dissolved in the molten feldspar. However, only a certain portion thereof remains in the crystals of the crystalline state, causing localized strains which reduce the mechanical characteristics of the composition. Thus, it has been recommended to substitute for feldspar, either completely or partially, fluxes which are richer in alkali metals so that the free quartz of the crude compositions is dissolved completely. In particular, it has been proposed to substitute syenitic nepheline for the feldspar.

Feldspar has the general formula $KAlSi_3O_8$ (for the orthoclase) or $NaAlSi_3O_8$ (for the albite). Natural feldspar is a mixture of these minerals along with silica. Syenitic nepheline has the formula $Na_6K_2Al_8Si_{32}$. Thus, the relative proportion of alkali metals in syenitic nepheline is much more important than in ordinary feldspar. This substance is therefore capable of dissolving free quartz and of improving the mechanical properties of ceramic compositions, as has already been noted by various workers in the field. This is true both for the aluminous compositions and for the more conventional porcelain or vitreous compositions.

The substitution of $Al_2O_3$ for $SiO_2$ results in a higher firing temperature, and it is known that it is necessary to utilize more active fluxes in a greater quantity when firing these compositions under the same conditions as are used for the usual porcelains.

Beginning with these latter considerations, it has been proposed in the prior art to prepare aluminous ceramic compositions, which may be used in the manufacture of insulators, having a mineralogical formula as follows (by weight):

| | Percent |
|---|---|
| $Al_2O_3$ | 15–45 |
| Ball clay and china clay | 25–60 |
| Flux comprising principally feldspar and syenitic nepheline | 20–40 |

In accordance with the present invention, it has been found that large percentages of fluxes in such compositions are not necessary. This is a distinct advantage since an excessive amount of fluxing material has the drawback of lowering the mechanical strength of the fired body and causes deformation and warpage of big insulators during the firing course. Furthermore, a great quanity of alkaline oxide bound to fluxing material lowers the electrical characteristics of the fired body.

SUMMARY OF THE INVENTION

An object of the present invention is to provide an aluminous ceramic composition which overcomes the disadvantages and deficiencies of the prior art compositions.

Another object of the present invention is to provide an aluminous porcelain composition having the best overall properties of drying temperature, firing point, color and price and particularly having improved mechanical, electrical and fabrication characteristics.

A further object of the present invention is to provide an aluminous porcelain composition which may be readily employed for manufacturing large dimensional, hitch tension insulators.

A still further object of the present invention is to provide an aluminous ceramic composition which may be fired without the use of a great amount of flux, thereby eliminating the disadvantages which result therefrom.

Other objects and further scope of applicability of the present invention will become apparent from the detailed description given hereinafter; it should be understood, however, that the detailed description and specific the invention, are given by way of illustration only, since various changes and modifications within the spirit and scope of the invention will become apparent to those skilled in the art from this detailed description.

Pursuant to the present invention, it has been found that the above-mentioned disadvantages may be elminated and a much improved aluminous porcelain composition containing the best overall properties of drying temperature, firing point, color, fabrication, mechanical and electrical characteristics and price, etc., may be obtained by providing a composition which comprises about 15 to 45% by weight alumina, about 30 to 60% by weight of clay and an effective amount up to but less than 20% by weight of fluxing materials, said porcelain composition containing about 0.5 to 4% by weight, based on the weight of the porcelain composition, of an oxide adjuvant consisting of a mixture of $TiO_2$ and $MnO_2$, each of said oxides being present in an amount effective to produce large dimensional, high tension insulators, and the like, possessing the best overall properties of fabrication, mechanical and electrical characteristics, etc. Advantageously, the alumina is introduced partially or entirely as calcined alumina. The alumina can also be introduced partially or entirely as natural hydrated alumina, such as bauxite or diaspore, partially or entirely calcined bauxite, or diaspore or partially or entirely in the form of fused bauxite or diaspore or fused corundum.

The aluminous porcelain composition of the present invention can use any clays which are effective in producing the insulators of the present invention. Typical clays include, for example, ball clay, china clay, and mixtures thereof. When a mixture of ball clay and china clay is utilized the weight ratio of ball clay to china clay present in the ceramic composition is less than one.

The fluxing materials include, for example, feldspar, stone, nepheline syenite and the like. As stated above, the aluminous porcelain composition of the present invention contains a mixture of $TiO_2$ and $MnO_2$ as an oxide adjuvant in an amount effective to produce the insulators of the present invention. The content by weight of the $TiO_2$-$MnO_2$ oxide adjuvant mixture in the aluminous porcelain composition is about 0.5 to 4%, based on the total weight of the ceramic composition. Said percentage range can contain, for example, about 0.15 to 3.65% by weight of $TiO_2$ and about 0.35 to 3.85% by weight of $MnO_2$. Advantageously, the weight ratio of the compounds $TiO_2$ and $MnO_2$ is about one part of $TiO_2$ for every two parts of $MnO_2$. As noted above, the aluminous ceramic compositions of the present invention contain less than about 20% by weight of flux, said flux including the oxides $TiO_2$ and $MnO_2$. However, although $MnO_2$ is not generally found in clay, particularly in an industrially measurable amount, clay can contain a small amount of $TiO_2$. Thus, the amount of $TiO_2$ and $NnO_2$ introduced into the ceramic composition by said flux in accordance with the present invention may vary, depending upon the amount of $TiO_2$ and/or $MnO_2$ already present in the raw materials, such as clay.

Taking this into consideration, the aluminous ceramic compositions should have a content of a mixture of $TiO_2$ and $MnO_2$ of about 0.5 to 4% by weight, based on the weight of the entire porcelain composition.

The ceramic compositions of the present invention may be fired in the conventional furnaces at the customary temperatures, that is to say, wherein the temperature is such that cones 8–11 of the pyrometric indicator (the Rhone Poulenc model) have completely fallen or are completely bent. As is known in the art, such an indicator shows the temperature to which the ceramic compositions are subjected, indicator 1 falling at a lower temperature than indicator 2, indicator 2 at a lower temperature than indicator 3, etc. The indicators also assume intermediate positions depending on the temperature.

The compositions of the present invention display improved characteristics as compared with mineralogically corresponding compositions which are devoid of the $TiO_2$-$MnO_2$ adjuvant. Also, in accordance with the present invention, the weight ratio of the ball clay to the amount of china clay present in a ceramic composition is less than 1.

By employing the above-mentioned factors, ceramic composition which advantageously display good mechanical characteristics in conjunction with the very favorable shaping properties may be provided.

Table 1 indicates, by way of information and without having a limiting character, the composition of the raw materials in the substances employed in the present invention. The percentages shown therein are by weight.

TABLE 1

| | Loss upon firing | $SiO_2$ | $Al_2O_3$ | $Fe_2O_3$ | CaO | MgO | $M_2O$ | $Na_2O$ | $TiO_2$ |
|---|---|---|---|---|---|---|---|---|---|
| Ball Clay (A) | 9.7 | 57.7 | 30.0 | 0.7 | 0.4 | 0.5 | 1.8 | 0.6 | |
| Ball Clay (B) | 12.6 | 54.4 | 30.1 | 0.6 | 0.7 | 0.7 | 0.4 | 0.9 | |
| Ball Clay (C) | 13.1 | 53.5 | 30.0 | 1.4 | 0.3 | 0.4 | 0.4 | 0.2 | |
| Ball Clay (D) | 11.7 | 55.62 | 30.0 | 0.58 | 0.11 | 0.16 | 0.83 | 0.18 | 0.72 |
| China Clay (E) | 12.9 | 47.0 | 37.6 | 0.6 | 0.5 | 0.4 | 0.6 | 0.1 | |
| China Clay (F) | 12.7 | 48.1 | 36.4 | 0.9 | 0.6 | 0.5 | 0.9 | 0.1 | |
| Feldspar | 0.2 | 65.4 | 19.1 | 0.4 | 0.3 | 0.1 | 11.5 | 3.1 | |
| Syenitic nepheline | 0.6 | 61.2 | 21.0 | 0.3 | 0.1 | | 5.8 | 11.0 | |
| Alumina (1) | | 99.2 | 70% of this alumina has an average particle size lower than $5\mu$ and a specific surface of the order of 4,000–4,500 cm.$^2$/g. | | | | | | |
| Alumina (2) | | 99.59 | 70% of this alumina has an average particle size lower than $5\mu$ and a specific surface of the order of 5,000 cm.$^2$/g. | | | | | | |

DESCRIPTION OF THE PREFERRED EMBODIMENTS

The following examples are given merely as illustrative of the present invention and thus are not to be considered as limiting. These examples indicate aluminous ceramic compositions which have the advantageous characteristics provided by the present invention.

EXAMPLE I

An aluminous ceramic composition having the following constituents was prepared:

| | Percent |
|---|---|
| Alumina 1 | 39 |
| Clay A | 11.5 |
| Clay B | 8 |
| China clay | 25 |
| Syenitic nepheline | 14.5 |
| $TiO_2$-$MnO_2$ adjuvant | [1] 2 |

[1] In about a 2 to 1 ratio of $MnO_2$ to $TiO_2$.

This composition has a resistance to bending of 35 kg./cm.$^2$ in the dry condition as measured on a cylinder having a diameter of 8 mm. between distant supports of 60 mm. at a temperature of 110° C. Fired in an industrial tunnel kiln, with indicator 11 fallen and 13 hardly bent, this composition shows a density of 2.76 g./cm.$^3$ and flexural strength of 2200 kg./cm.$^2$ the latter being measured with a sample length having a diameter of 6 mm. between supports of 25 mm. If glazed in a conventional manner, the same sample shows a flexural strength of 2760 kg./cm.$^2$.

EXAMPLE II

An aluminous ceramic material having the following composition was prepared:

| | Percent |
|---|---|
| Alumina 1 | 40 |
| Clay C | 15 |
| China clay | 26 |
| Syenitic nepheline | 10 |
| Feldspar | 7 |
| TiO$_2$-MnO$_2$ adjuvant | [1] 2 |

[1] In about a 2 to 1 ratio of MnO$_2$ to TiO$_2$.

This resistance of this composition to bending in the dry condition is 50 kg./cm.$^2$. When the composition is fired in an industrial tunnel kiln with an oxidizing atmosphere, wherein indicator 8 is entirely bent and indicator 9 is just touching its base with the extremity thereof, it displays a density in the baked condition of 2.94 g./.cm.$^3$, a flexural strength of 2425 kg./cm.$^2$ measured on a small rod having a diameter of 6 mm. and a flexural strength of 2625 kg./cm.$^2$ on a glazed small rod. The firing range of this body corresponds to the firing range of two firing cones. By baking the composition in an industrial tunnel furnace in a reducing atmosphere, there is obtained a flexural strength on an unglazed rod of 2620 kg./cm.$^2$ and of 3140 kg./cm.$^2$ on the rod glazed in a conventional manner.

EXAMPLE III

An aluminous ceramic having the following composition was prepared:

| | Percent |
|---|---|
| Alumina 2 | 30 |
| Clay D | 8 |
| Clay E | 13 |
| China clay | 30 |
| Syenitic nepheline | 8.5 |
| Feldspar | 8.5 |
| TiO$_2$-MnO$_2$ adjuvant | [1] 2 |

[1] In about a 2 to 1 ratio of MnO$_2$ to TiO$_2$.

The resistance of this composition to bending in the dry condition was 36 kg./cm.$^2$. By firing under the conditions set forth in Example II, the composition shows a density of 2.8 g./cm.$^3$ and a flexural strength (measured on a rod having a diameter of 6 mm.) of 2220 kg./cm.$^2$. If the firing is done in a reducing atmosphere, a flexural strength of 2510 kg./cm.$^2$ on the unglazed rod and 2896 kg./cm.$^2$ on a glazed rod is obtained.

EXAMPLE IV

An aluminous ceramic having the following composition was prepared:

| | Percent |
|---|---|
| Alumina 2 | 30 |
| Clay C | 15 |
| China clay | 36 |
| Feldspar | 8.5 |
| Syenitic nepheline | 8.5 |
| TiO$_2$-MnO$_2$ adjuvant | [1] 2 |

[1] In about a 2 to 1 ratio of MnO$_2$ to TiO$_2$.

The resistance to bending of this composition in a dry condition was 35 kg./cm.$^2$. After the composition was fired under the conditions indicated in Example II, the density thereof was 2.84 g./cm.$^3$ while the flexural strength measured on a small rod having a diameter of 6 mm. is 2160 kg./cm.$^2$.

The use of a mixture of TiO$_2$ and MnO$_2$ in the aluminous ceramic compositions has a specific action not only in reducing the firing temperature thereof but also on the texture of the resultant body. An experiment indicating these facts was carried out as follows:

EXAMPLE V

An aluminous composition having the same chemical composition (fluxing adjuvant excepted) and a very close mineralogical resemblance to the compositions of the present invention was prepared having the following constituents:

| | Percent |
|---|---|
| Alumina 1 | 40 |
| Feldspar | 24 |
| Ball clay A | 25 |
| China clay | 11 |

A sample of this composition, under the experimental conditions set forth in Example II, shows a flexural strength of about 2200 kg./cm.$^2$ on an unglazed rod thereof and a density of 2.846 g./cm.$^3$. The density of the composition according to Example II was 2.94 g./cm.$^3$ which, even after taking into account the introduction of the high density oxides TiO$_2$ and MnO$^2$, represents an improvement in the density of about 2%. The improvement in the test pieces is reflected in the mechanical resistance thereof, that of Example II being 2425 kg./cm.$^2$ while that of this example is about 2200 kg./cm.$^2$.

A further experiment to show the specific action of the flux is shown in Example VI.

EXAMPLE VI

An aluminous ceramic was prepared having the same composition as that of Example IV except that the TiO$_2$-MnO$_2$ mixture was replaced by the same quantity of a mixture of feldspar and syenitic nepheline. This composition has a density of 2.70 g./cm.$^3$, and a mechanical strength of 1890 kg./cm.$^2$. This is to be compared with the density of 2.84 g./cm.$^3$ and mechanical strength of 2160 kg./cm.$^2$ shown by the composition of Example IV.

Also, it should be noted that the composition of Example IV which contains 30% of Al$_2$O$_3$ (alumina 2) has mechanical characteristics corresponding to the composition of Example V which contains 40% of Al$_2$O$_3$. Thus, a savings of 25% calcined alumina, a relatively expensive raw material, is obtained according to the ceramic compositions of the present invention.

It should be further noted that the compositions shown in Examples I, II, III and IV herein, being exemplary of the present invention, contain a ratio of the weight of ball clay to the weight of china clay of less than 1. In fact, the ratio by weight of ball clay to china clay in Examples I, II, III, IV is 19.5:25, 15:26, 21:30, and 15:36, respectively. However, this same ratio in the composition of Example V is 25:11.

The mineralogical compositions according to the present invention may be easily ascertained stoichiometerically by means of Table I herein which shows various percentages of raw materials therein. By considering the total amount of alkali metals, alkaline earth metals and TiO$_2$-MnO$_2$ as a single molecular unit, it is seen that the compositions according to the present invention are characterized by having a range of molecular units of from 6 to 9 of alumina and from 9 to 7 of SiO$_2$. In other words, the molecular ratio of the amount of alumina present in the compositions of the present invention with respect to all of the other components, except SiO$_2$, ranges from about 6 to 9:1, whereas the molecular ratio between the amount of silica with respect to the other components in the composition, except Al$_2$O$_3$, is in the range of about 9 to 7:1. This, of course, means that the compositions of the present invention have a relatively low percentage of vitreous mass with respect to the amount of crystalline mass, thereby explaining the excellent mechanical and electrical properties thereof.

The following comparative data shows improved and unexpected results when comparing an aluminous porcelain composition containing from 0.5 to 4% by weight of TiO$_2$ and MnO$_2$ with a similar aluminous porcelain composition not containing a mixture of said oxide adjuvants.

The following experiments were carried out to show the unexpected results obtained when conducting the present invention as compared to the prior art.

Five ceramic bodies were prepared in the same conditions and from the same raw materials. These bodies correspond to the Formulas A-B-C-D-E of the following table:

|  | A | B | C | D | E |
|---|---|---|---|---|---|
| Alumina Alcan C 71 F G | 40 | 40 | 40 | 40 | 40 |
| $TiO_2$ | 0.72 | 2 |  | 0.72 |  |
| Pyrolusite | 1.28 |  | 2 |  | 1.28 |
| Nepheline syenite A 200 | 10 | 10 | 10 | 10 | 10 |
| Felspar Buckingham | 7 | 7 | 7 | 7 | 7 |
| Ball-Clay Mississippi | 15 | 15 | 15 | 15 | 15 |
| China Clay Grolleg | 26 | 26 | 26 | 26 | 26 |
| Total | 100 | 100 | 100 | 98.72 | 99.28 |

Body A is made according to Example 2 of the present specification. Body B is derived from body A by substitution of a 2% additive of $TiO_2$ for a 2% additive containing 0.72% $TiO_2$ and 1.28% $MnO_2$. Body C is derived from body A by substitution of a 2% additive of $MnO_2$ for a 2% additive containing 0.72% $TiO_2$ and 1.28% $MnO_2$. Body D is derived from body A by substitution of a 0.72% additive of $TiO_2$ for a 2% additive containing 0.72% $TiO_2$ and 1.28% $MnO_2$. Body E is derived from body A by substitution of a 1.28% additive of $MnO_2$ for a 2% additive containing 0.72% of $TiO_2$ and 1.28% $MnO_2$. Thus ceramic body A represents the composition of the present invention whereas ceramic bodies B, C, D and E represent similar ceramic bodies used for comparison purposes.

Thus we can compare a body according to the present invention, a body containing the same total quantity of additive but with only one of the elements $TiO_2$ or $MnO_2$ constituting the additive according to the present invention, or a body containing only one of the two components $TiO_2$ or $MnO_2$ in the same quantity as this component is contained in body A according to the present invention. Therefore, we can show the influence of the simultaneous use of the two components $TiO_2$ and $MnO_2$ compared with the addition of only one components, $TiO_2$ or $MnO_2$, the quantity of additive being the same or in the same component percentage.

The bodies were prepared by mixing with a turbomixer 2 kg. of dry material and 2 liters of water. The slip obtained was partially dried to an average water content of about 20% and the body thus prepared was extruded in a vacuum extruder into about 6 mm. diameter rods. Ten rods of each sort, of about 50 mm. length, were fired in a laboratory kiln in approximately the same position, with Seger firing cones.

Two firing types were used: an oxidizing firing characterized by a $$\text{characterized by a } \frac{\text{air}}{\text{combustion gas}} = 11 \text{ ratio}$$

and a reducing firing characterized by a $$\frac{\text{air}}{\text{combustion gas}} = 9 \text{ ratio}$$

At various temperatures corresponding to the cone position indicated in the circles and shown on the abscissa in diagrams I, II, III, IV, the samples were taken out of the kiln and a measure of density and bending strength was made on each one. The measured values, average from 10 measures, were recorded on diagrams I to IV after verification that these mean values were not sensibly different from the central value of a Henri distribution. The values obtained for each composition are joined by lines of the same nature.

Figure 2:
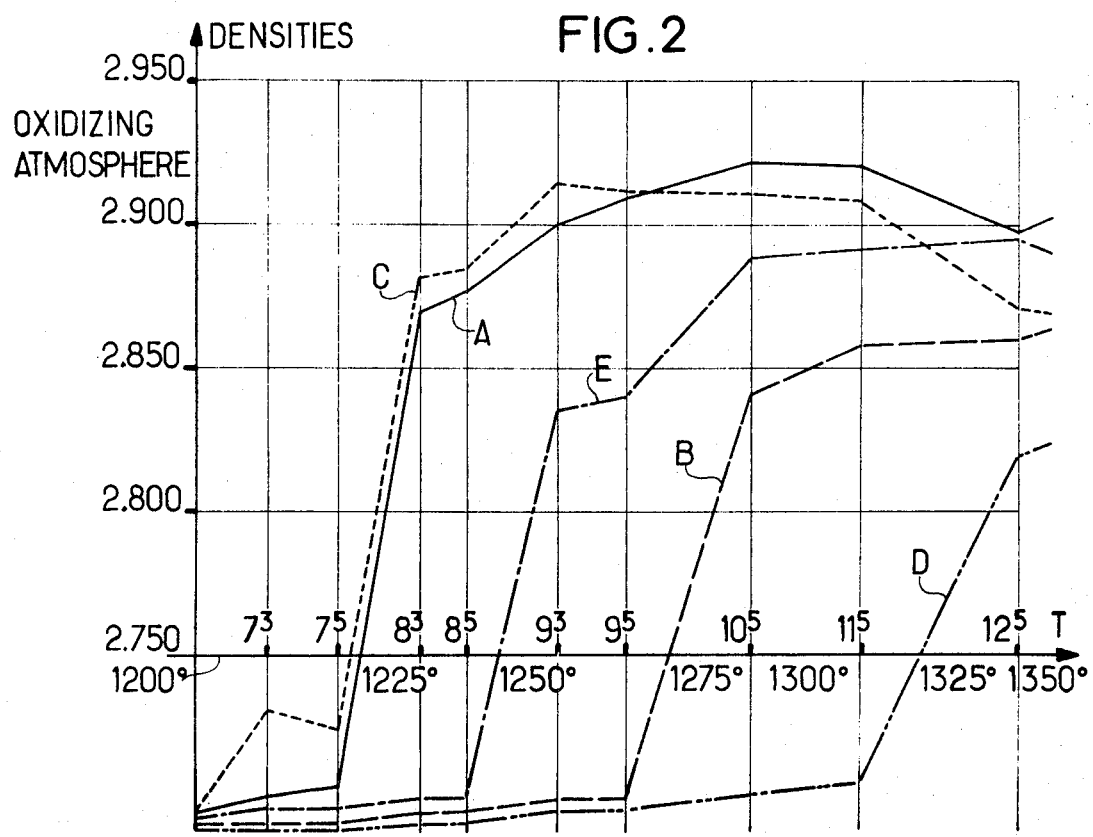
Figure 3:
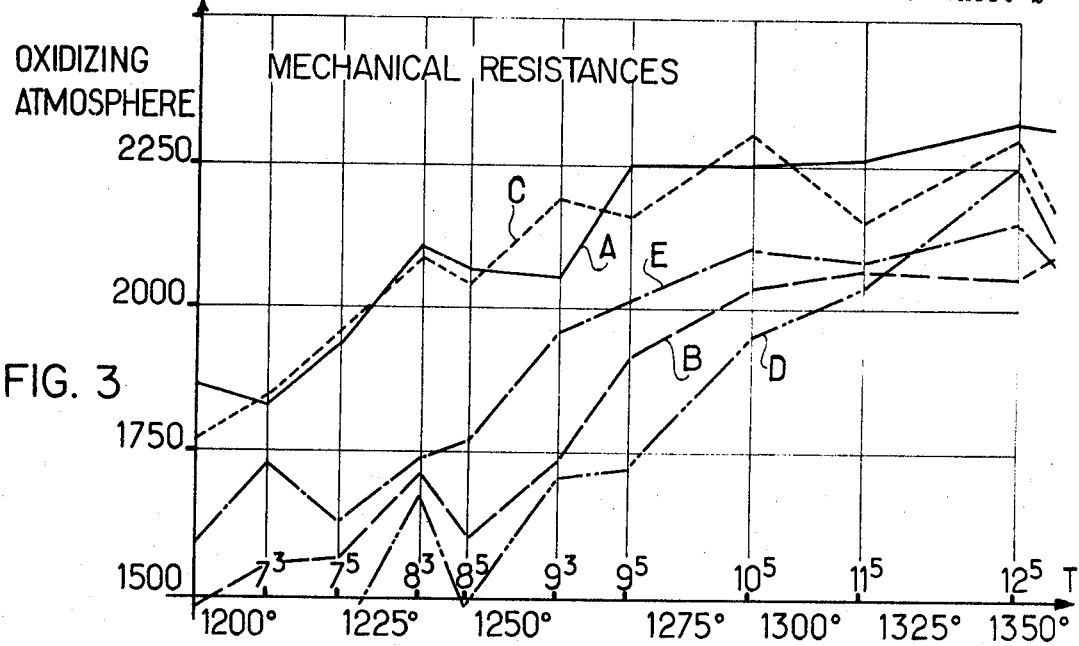
Figure 4:
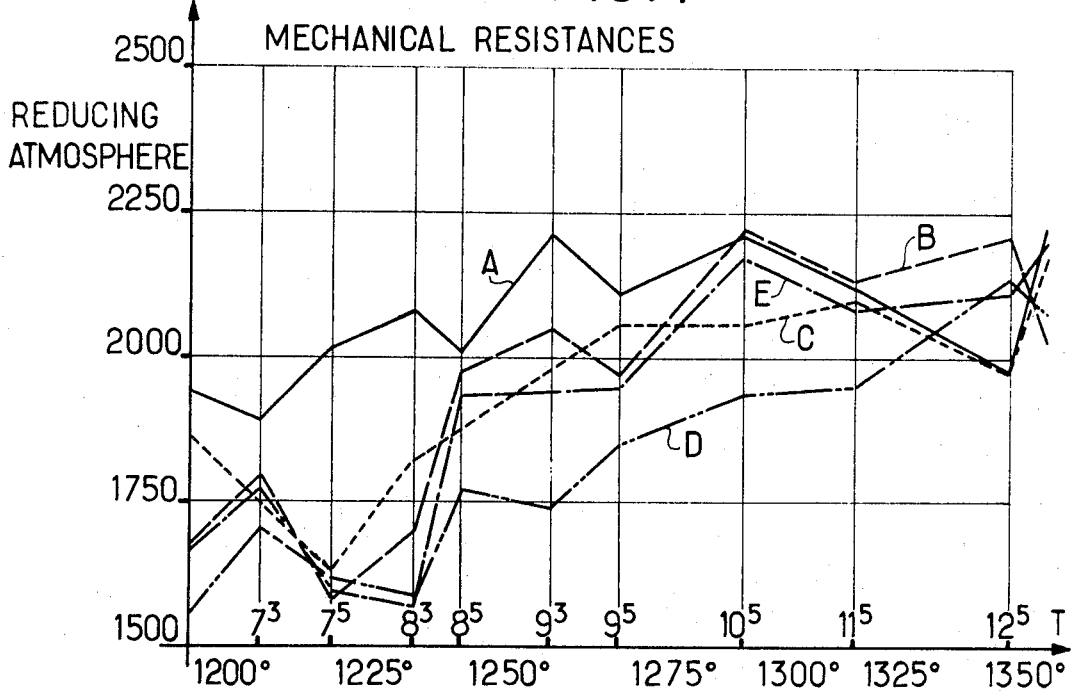

The measure of density was made by the hydrostatic method and the measure of bending strength was made by loading in the middle, a rod placed on two supports 30 mm. apart. From the consideration of the graphs shown in FIGS. 1, 2, 3 and 4 of the drawings in which:

FIG. 1 and FIG. 2 show graphs that represent a measure of the firing range and density of the respective ceramic bodies and, FIGS. 3 and 4 show graphs in which the bending strength of the aluminous porcelain composition of the present invention is compared, we can draw the following conclusions:

The graphs shown in FIGS. 1 and 2, as noted above, represent a measurement of the firing range and density of the respective ceramic bodies. The firing range corresponds to the temperature zone in which the bodies reach their maximum density. The graps shown in FIGS. 1 and 2 clearly show that bodies A and C, and particularly body A, have a wider firing range in both oxidizing as well as reducing atmospheres than bodies B, D and E. Thus, when using body A, according to the present invention, higher densities can be obtained when compared to the maximum densities obtainable with the other ceramic bodies. The higher densities obtained when fabricating body A gives evidence of a lower closed porosity and a body better adapted to electrical insulation. Furthermore, it can be observed from these graphs that higher densities can be obtained at much lower temperatures when fabricating body A when compared to bodies B, C, D and E.

A comparison of the bending strength of the aluminous procelain composition of the present invention is shown in the graphs shown in FIGS. 3 and 4. In an oxidizing atmosphere, bodies A and C exhibit the highest mechanical resistance at given temperatures, although body A exhibits the best overall bending strength property. In a reducing atmosphere the bending strength of body A remains the highest of all of the remaining bodies and body C is replaced by body B as being second to body A in overall bending strength. It is clear that body A, which is that defined by the present invention, clearly shows the best overall bending strength in both an oxidizing and reducing atmosphere when compared to bodies B, C, D and E.

The invention being thus described, it will be obvious that the same may be varied in many ways. It is to be understood that the present invention is by no means limited to the specific examples described hereinabove but that modifications as to details or the replacement of certain substances by equivalent substances may be made. Such variations are not to be regarded as a departure from the spirit and scope of the invention and all such modifications are intended to be included within the scope of the following claims.

What is claimed is:

1. An aluminous porcelain composition useful for making large-dimensional, high tension insulators possessing high mechanical strength and good fabrication properties which consists essentially of about 15 to 45% by weight of alumina, about 30 to 60% by weight of clay and an effective amount up to but less than about 20% by weight of fluxing materials selected from the group consisting of feldspar, stone and nepheline syenite, said porcelain composition containing about 0.5 to 4% by weight, based on the weight of the porcelain composition, of an oxide adjuvant consisting of a mixture of $TiO_2$ and $MnO_2$, each of said oxides being present in an effective fluxing amount.

2. The aluminous porcelain composition of claim 1 wherein $TiO_2$ is present in an amount of about 0.15 to 3.65% by weight and $MnO_2$ is present in an amount of about 0.35 to 3.85% by weight.

3. The aluminous porcelain composition of claim 1 wherein the weight ratio of the oxide mixture is about 1 part $TiO_2$ and about 2 parts of $MnO_2$.

4. The aluminous porcelain composition of claim 1 wherein the alumina is introduced partially or entirely as calcined alumina.

5. The aluminous porcelain composition of claim 1 wherein the alumina is introduced partially or entirely as natural hydrated alumina.

6. The aluminous porcelain composition of claim 5 wherein the natural hydrated alumina is bauxite or diaspore.

7. The aluminous porcelain composition of claim 1 wherein the alumina is introduced partially or entirely as calcined bauxite or diaspore.

8. The aluminous porcelain composition of claim 1 wherein the alumina is introduced partially or entirely as fused bauxite or diaspore.

9. The aluminous porcelain composition of claim 1 wherein the alumina is introduced partially or entirely as fused corundum.

10. The aluminous porcelain composition of claim 1 wherein the clay is selected from the group consisting of ball clay, china clay and mixtures thereof.

11. The aluminous porcelain composition of claim 10 wherein the clay is a mixture of ball clay and china clay in a weight ratio of less than about 1.

12. The aluminous porcelain composition of claim 1 wherein the molecular ratio between the amount of alumina present in the composition and the total of all of the other components thereof, except $SiO_2$, is about 6–9:1.

13. The aluminous porcelain composition of claim 1 wherein the molecular ratio between the amount of silica present in the composition and the total of all of the other components thereof, except $Al_2O_3$, is about 7–9:1.

14. An aluminous porcelain composition useful for making large-dimensional, high tension insulators possessing high mechanical strength and good fabrication properties which consists essentially of about 15 to 45% by weight of alumina, about 30 to 60% by weight of a mixture of ball clay and china clay, and an effective amount up to but less than about 20% by weight of fluxing materials selected from the group consisting of feldspar, stone and nepheline syenite, said porcelain composition containing about 0.5 to 4% by weight, based on the weight of the porcelain composition, of an oxide adjuvant consisting of about 1 part of $TiO_2$ to about 2 parts of $MnO_2$.

15. The aluminous porcelain composition of claim 14 wherein the alumina is at least partially calcined alumina.

16. An aluminous porcelain insulator possessing high mechanical strength and good electrical characteristics which consists essentially of about 15 to 45% by weight of alumina, about 30 to 60% by weight of clay and an effective amount up to but less than about 20% by weight of fluxing materials from the group consisting of feldspar, stone and nepheline syenite, said porcelain composition containing about 0.5 to 4% by weight, based on the weight of the porcelain composition, of an oxide adjuvant consisting of a mixture of $TiO_2$ and $MnO_2$, each of said oxides being present in an effective fluxing amount.

17. The insulator of claim 16 wherein the alumina is at least partially calcined alumina.

18. The insulator of claim 16 wherein $TiO_2$ is present in an amount of about 0.15 to 3.65% by weight and $MnO_2$ is present in an amount of about 0.35 to 3.85% by weight.

19. The insulator of claim 16 wherein the weight ratio of the oxide mixture is about 1 part $TiO_2$ to about 2 parts $MnO_2$.

20. An aluminous porcelain composition comprising by weight:

| | Percent |
|---|---|
| alumina | 39 |
| ball clay | 19.5 |
| china clay | 25 |
| syenite nepheline | 14.5 |
| $TiO_2$-$MnO_2$ | [1] 2 |

[1] The ratio of $MnO_2$ to $TiO_2$ being about 2 to 1.

21. An aluminous ceramic composition comprising by weight:

| | Percent |
|---|---|
| alumina | 40 |
| ball clay | 15 |
| china clay | 26 |
| feldspar | 7 |
| syenitic nepheline | 10 |
| $TiO_2$-$MnO_2$ | [1] 2 |

[1] The ratio of $MnO_2$ to $TiO_2$ being about 2 to 1.

22. An aluminous ceramic composition comprising by weight:

| | Percent |
|---|---|
| alumina | 30 |
| ball clay | 21 |
| china clay | 30 |
| syenitic nepheline | 8.5 |
| feldspar | 8.5 |
| $TiO_2$-$MnO_2$ | [1] 2 |

[1] The ratio of $MnO_2$ to $TiO_2$ being about 2 to 1.

23. An aluminous ceramic composition comprising by weight:

| | Percent |
|---|---|
| alumina | 30 |
| ball clay | 15 |
| china clay | 36 |
| syenitic nepheline | 8.5 |
| feldspar | 8.5 |
| $TiO_2$-$MnO_2$ | [1] 2 |

[1] The ratio of $MnO_2$ to $TiO_2$ being about 2 to 1.

References Cited
UNITED STATES PATENTS

| 2,898,217 | 8/1959 | Selsing | 106—46 |
| 3,291,619 | 12/1966 | Luks | 106—46 |

TOBIAS E. LEVOW, Primary Examiner

W. R. SATTERFIELD, Assistant Examiner

U.S. Cl. X.R.

106—45; 174—137 B; 264—61